United States Patent [19]

Conway

[11] Patent Number: 4,881,615

[45] Date of Patent: Nov. 21, 1989

[54] ANTI-THEFT DEVICE FOR MOTOR VEHICLES

[76] Inventor: Robert Conway, 12 Tweed Grove, Lemington, Newcastle upon Tyne NE15 8EX, England

[21] Appl. No.: 276,777

[22] Filed: Nov. 28, 1988

[30] Foreign Application Priority Data

May 27, 1987 [GB] United Kingdom ............... 8712384
May 23, 1988 [GB] United Kingdom ............... 8812140

[51] Int. Cl.[4] ............................................. B60K 27/00
[52] U.S. Cl. ..................................... 180/287; 188/353
[58] Field of Search ......................... 180/287; 188/353

[56] References Cited

U.S. PATENT DOCUMENTS

| | | | |
|---|---|---|---|
| 3,973,805 | 8/1976 | Stevenson et al. | 180/287 |
| 4,446,950 | 5/1984 | Wise et al. | 180/287 |
| 4,579,202 | 4/1986 | McIntosh | 180/287 |
| 4,721,192 | 1/1988 | Cano et al. | 188/353 |

Primary Examiner—Kenneth R. Rice
Attorney, Agent, or Firm—Hopgood, Calimafde, Kalil, Blaustein & Judlowe

[57] ABSTRACT

An anti-theft device for a motor vehicle having an hydraulically-operated braking system comprises a plunger engagable with a flexible sealing ring, to close the fluid path between the pressure fluid supply and the brake cylinders. The plunger is inserted into the ring to seal with generally axially extending portion of the ring projecting freely in the direction of flow towards the vehicle's brakes. Application of pressure from the supply flexes said portion to away from sealing contact with the plunger to permit flow of fluid from the pressure fluid supply to the brake cylinders. Return flow of fluid from the brake cylinders to the supply is however prevented, whereby the brakes can be applied but cannot thereafter be removed until the plunger is withdrawn. The device further comprises means for locking the plunger in its operative position.

7 Claims, 1 Drawing Sheet

ANTI-THEFT DEVICE FOR MOTOR VEHICLES

BACKGROUND OF THE INVENTION

This invention relates to anti-theft devices for motor vehicles and more particularly to such devices for incorporation in the hydraulic braking systems of motor vehicles.

Theft of motor vehicles, particularly domestic motor cars, is a major social problem, and numerous antitheft and alarm devices are currently available to the motorist for protecting his vehicle. However most known devices suffer from one or more disadvantages.

Electrically-operated devices can fairly readily be de-activated by appropriate disconnection from the electrical supply. In this respect, access to the associated electrical supply can be achieved from beneath the car and without raising undue suspicion by a potential thief. Furthermore, audible and/or visual alarm devices may deter a thief from entering a vehicle, but do not in any way de-activate the vehicle itself which can be removed once entry is achieved.

Steering locks, although efficient, can be picked or 'popped', particularly with the sophisticated tools currently available.

There have also been proposals, in particular with the wide adoption of hydraulic braking circuits, for immobilising a motor vehicle by locking its brakes on. By closing the return path for the hydraulic fluid from the brake cylinders using a security key, while permitting the driver then to apply hydraulic pressure to the brake cylinders, the brakes can be locked on until the security key is released. It is fundamental, however, that the safety of a vehicle braking system must not be compromised. The problem exists with this form of system of providing an arrangement which not only effects the locking operataion reliably over a long surface life but which does not carry any risk of impairing the operation of the brake system when the vehicle is being driven.

As examples of earlier proposals for security locking menas for motor vehicle brake circuits, reference can be made to GB 449095, 732042, 1104432 and 2024351A, EU 0064124A and 0239987A, US 3579285 and WO85/04845.

In GB 732042, GB 2024351, EU 0064124A and EU 0239987A, the hydraulic fluid return path is closed by spring-loaded ball valves, but these cannot be relied upon to provide completely fluid-tight sealing over a prolonged period; moreover, if there is any corrosion with the passage of time they bring the risk that the valve ball will stick in its seating, so increasing the braking effort needed, or in an extreme case, making it impossible to open the fluid path in either direction. An analogous case is provided by GB 449095, GB 1104432 and US 3579285 where the return flow is blocked by spring-loaded poppet valves. In the example of WO85/04815, an axially slidable spindle valve is employed to control the flows between a multiplicity of ports in a valve housing and the possibility of a hydraulic short circuit developing through loss of sealing efficiency would bring the danger of failure of hydraulic brake circuit while the vehicle is being driven.

SUMMARY OF THE INVENTION

According to the present invention, the valve locking the brake on is characterised in that it comprises an annular sealing ring and a closure member mounted coaxially with the sealing ring, the sealing ring having a radially inner sealing portion extending axially of the ring in the direction of flow from the supply means to the operating means, the closure member being axially displaceable to be inserted in said sealing ring to bring said inner portion of said ring into sealing engagement with the periphery of said member, thereby to close the valve the prevent flow from the operating means to the supply means, said inner portion being resiliently flexible way from the inserted closure member by a positive pressure difference between the supply side and the operating side of the valve to admit pressure fluid from the supply side to the operating side while blocking flow in the reverse direction.

It will be appreciated that with such an arrangement and with the closure member in its operative position, depression of the vehicle brake peddle causes flexure of the radially inner portion of the seal by the high pressure from the supply means to transmit that pressure to the brake operating means, as if a positive pressure difference arises in the opposite direction, the axially extending portion of the seal is pressed more firmly against the operating member. Such an arrangement thus provides the possibility of safe and reliable operation of the device over a very long service life.

Preferably the closure member projects from a body of the valve through an opening therein to actuating means and a afurther fluid seal is provided for the periphery of the closure member is said opening, said further seal also comprising an axially extending seling portion, said sealing portion being clamped more firmly against the member by pressure from the supply means.

Further security can be provided if the device includes electric switch means, the state of which is altered on movement of the closure member between its operative and inoperative positions, said switch means, with the closure member in its seaaling position, breaking a starter circuit of the vehicle engine.

By way of example only, an embodiment of the invention will not be described in greater detail with reference to the accompanying diagrammatic drawaings.

DESCRIPTION OF THE PREFERRED EMBODIMENT

Figure 1:
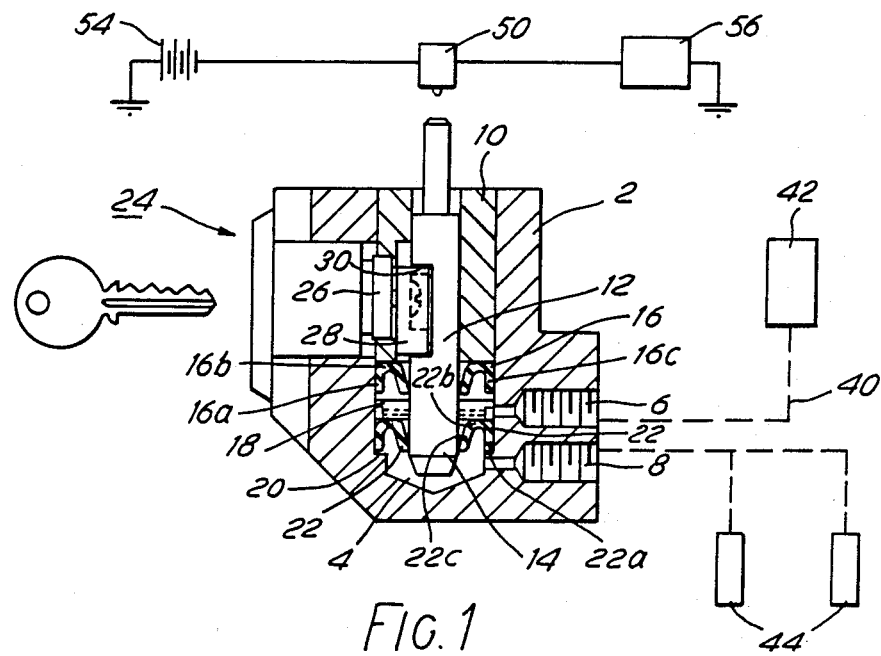
FIG. 1 is a vertical section through an antitheft device according to the invention, also illustrated schematically its connections in the vehicle braking circuit and to the vehicle starter motor circuit.

Referring to the drawings, the illustrated device comprises a valve housing 2, which may be a casting of light alloy, in which is defined a chamber 4 provided with an inlet 6 and an outlet 8. A substantially cylindrically sleeve 10 of, for example, aluminium is a push-fit in an associated recess 11 formed in the housing 2, the bore of the sleeve 10 communicating into the chamber 4.

Slidably mounted in the sleeve 10 is substantially cylindrical plunger 12, one end extent 14 of which projects into the chamber 4. A flexible sealing ring 16, eg. of neoprene, consists of an outer cylindrical portion 16a sealing against the wall of the recess 11, an intermediate annulara portion 16a sealing against the sleeve 10, and an inner, generally axially directed portion 16c in the form of a lip extending freely from the intermediate portion to form a resilient seal with the periphery of the plunger 12. The sealing ring 16 thus closes the chamber 4 against leakage past the sleeve 10 and the plunger 12.

Separated from the sealing ring 16 by an annular spacer 18 and located between the spacer and a shoulder 20 formed in the chamber 4 above the outlet 8 is a second sealing ring 22 which has an outer sealing portion 22a, intermediate annular portion 22b and inner, generally axially directed sealing portion 22c, in the same manner as the sealing ring 16.

The spacer 18 within the chamber 4 is provided with a circumferential recess 18a and radial passageways 18b to permit the flow of fluid from the inlet 6 into the chamber 4 in the space between the two sealing rings 16,22.

A key-operated cylinder lock of known type, indicated generally at 24, is mounted in a sidewall of the housing 2, the inner end barrel 26 of the lock carrying an eccentrically-mounted cam member 28 rotatable with the barrel. The cam member 28 extends through an aperture in the sidewall of the sleeve 10 and seats closely in an axially-extending recess 30 in the sidewall of the plunger 12. The arrangement is such that, on rotation of the cam member 28 by manipulation of the key in the lock 24, the cam member 28 acts on the plunger 12 to displace it axially within the sleeve 10.

Figures 2A, 2B, 2C:
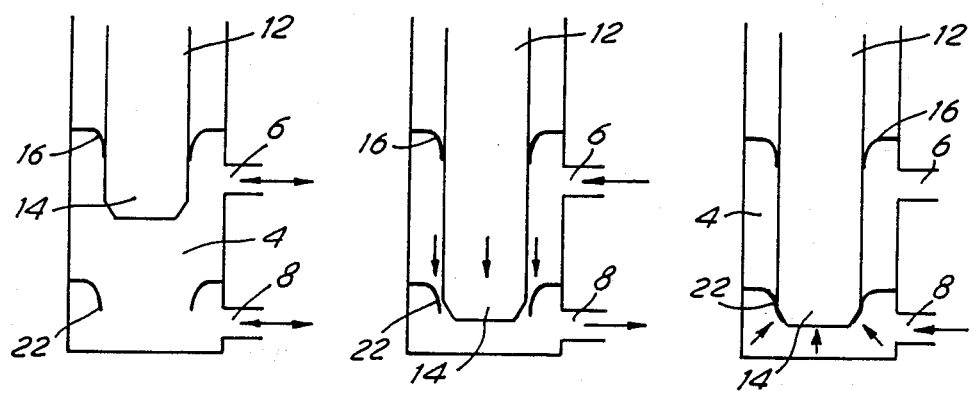
FIGS. 2a, 2b and 2c are schematic illustrations of the plunger of the device of FIG. 1 in its different positions and under various hydraulic conditions.

More particularly, the lock 24 has a normal rest position in which the cam member 28 is so positioned that the plunger 12 is in an uppermost, inoperative position with the lower end 14 of the plunger located above the sealing ring 22 as shown in FIG. 2a. By rotating the lock barrel with the key the cam member 28 can displace the plunger 12 to a lowermost operative position, as illustrated in FIG. 1, with the end 14 of the plunger extending through the sealing ring 22 and in sealing engagement therewith.

In use as an anti-theft device for a otor vehicle having an hydraulically-operated braking system, the device is interposed in the brake circuit 40 between fluid supply cylinder 42 and brake cylinders 44 such that pressure fluid from the supply cylinder feeds to the inlet 6 and exits from the outlet 8 to the brake cylinders. With the lock 24 and plunger 12 in the inoperative positioins shown in FIG. 2a, hydraulic fluid can flow thus to and from the brake cylinders and the supply cylinder in accordance with the arrows in FIG. 2a as dictated by the driver's use of the brake pedal. The device does not interfere in any way with the operation of the brakes.

When it is desired to deactivate the vehicle, the lock barrel 26 is turned by its key to move the plunger 12 downwardly into the operative position shown in FIGS. 1 and 2c with the end 14 of the plunger engaged by the inner, axially directed portion 22c of the seal 22 to seal the fluid path through the chamber between the inlet 6 and outlet 8. In this state, however, if the driver operates his brake pedal the additional hydraulic pressure appliedd through the inlet 6 can flex the free inner portion 22c of the sealing ring 22 away from the plunger, as shown in FIG. 2b, to drive pressure fluid through the device and apply the vehicle brakes.

On release of the brake pedal, however, fluid is prevented from returning from the brake cylinders to the supply cylinder because of the configuration of the inner portion 22c of the sealing ring 22. This freely extending portion lies against the plunger, so that an overpressure on the exit side of the chamber 4 relative to the entry side serves to urge it more firmly against the plunger 12 to ensure a fluid-tight seal. The sealing ring 22 thus acts as a one-way valve in which the greater is the fluid pressure in the brake cylinders the greater is the sealing of the valve. Thus the brakes cannot be released and the vehicle is effectively immobilised until the lock is returned to its inoperative position.

Although the device can be located anywhere within the vehicle, it is preferred that it is mounted in or on the facia panel to be readily accessible to the driver of the vehicle in his normal driving position. On leaving the vehicle, the driver turns the key in the lock 24 and depresses the brake pedal to activate the device. On his return, the driver returns the lock to withdraw the plunger, whereby the brakes are released and the braking system is returned to its normal condition.

The device according to the invention may further include means for de-activating the electrical starting system of the vehicle. For example, a push-button operated electric microswitch 50 may be mounted on the housing 2 for actuation by movement of the cam member 28 or, preferably, the plunger 12. Conveniently, the switch is mounted above the plunger 12 as indicated in FIG. 1, whereby as the plunger is inserted into the sealing ring 22 it changes the electrical condition of the switch.

The switch may be incorporated in the ignition circuit such that the actuation of the brake locking device, as well as locking the brakes in the on position, isolates ignition circuit of the vehicle from the supply battery 54. Preferably, however, the switch is incorporated in the low-tension circuit of a solenoid 56, as illustrated in FIG. 1, controlling operation of the starter motor: with the device actuated the starter motor remains inactive and the engine cannot be started even if the ignition circuit is completed.

Thus there is provided an anti-theft device for a motor vehicle which, when activated, gives the impression to a potential thief that the vehicle has seized brakes and a flat battery. The device is noiseless and can incorporate a lock which is not easily picked even with the sophisticated tools currently available, while the device actually prevents removal of the vehicle if unauthorised entry is achieved. Clearly the device could also be used in combination with audible alarm systems.

The valve comprising the plunger 12 and its peripheral seal 22 can be employed as a non-return valve for other purposes than the anti-theft device described above. The invention therefore extends to such non-return valves generally, embodying a sealing ring that engages a closure member with an axially extending portion that can be elastically deformed to permit flow past the valve in one direction.

I claim:

1. An anti-theft device for a motor vehicle having a hydraulically operated braking system, said system comprising a hydraulic pressure supply means and a brake operating means for actuation by pressure fluid from said supply means, a pressure fluid path extending between said supply and operating means, the device being disposed in said fluid path and comprising a valve body, inlet and outlet ports in said body for connection to the supply means and the operating means respectively, a fluid flow path in said body between said ports, a flexible sealing ring mounted within the body defining an orifice in said path, a closure member slidably supported in said body for displacement coaxially of the sealing ring into and out of engagement therewith, said sealing ring comprising an annular portion projecting radially inwards from a fixed seal support in said body, and a radially inner portion extending axially from said annular portion in the direction of flow along said fluid flow path from the inlet port to the outlet port, by said coaxial displacement the closure member being removably inserted into sealing engagement with said axially extending portion of the sealing ring to close said fluid flow path, said axially extending portion being resiliently deformable by the application of hydraulic pressure through the inlet port whereby it allows the passage of pressure fluid past said closure member to the outlet port but is urged more firmly into sealing contact with said closure member when the outlet port pressure is greater than the inlet port pressure.

2. A device according to claim 1 wherein a body of the valve has an opening through which the closure member projects to actuating means and a further fluid seal is provided for the periphery of the closure member in said opening, said further seal also comprising an axially extending sealing portion, said sealing portion being clamped more firmly against the member by pressure from the supply means.

3. A device according to claim 1 wherein a cam mounted for rotation on the valve body effects said displacement of the closusre member.

4. A device as claimed in claim 3 wherein a keyoperated lock is mounted on the valve body, a barrel of said lock carrying the cam for rotation of the cam with said barrel in the operation of the lock.

5. A device as claimed in claim 1 further comprising electric switch means, the state of which is altered on movement of the closure member between its operative and inoperative positions, a starter circuit of the vehicle engine being associated with said switch means such that said switch means breaks said circuit when the closure member is displaced to its sealing position.

6. A device as claimed in claim 5 in which the switch means comprises a switch mounted on the valve body, in its inoperative position the valve closure member engaging the switch to maintain the switch in a first state permitting the completion of an engine starting circuit, movement of the closure member to its operative position releasing the switch to bring it to a second state in which starting circuit is broken.

7. A device as claimed in claim 6 in which in said second state the electrical switch is arranged to break a low tension circuit to a solenoid controlling operation of a starter motor of the engine.

* * * * *